March 31, 1925.                                                      1,531,636
W. S. WITTER
SPARK PLUG AND IGNITION TESTER
Filed July 13, 1922
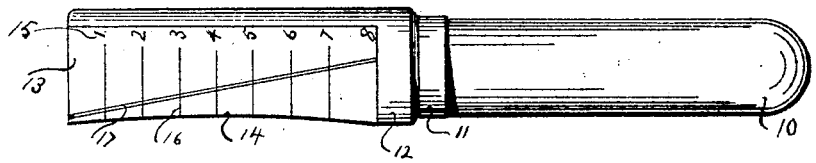
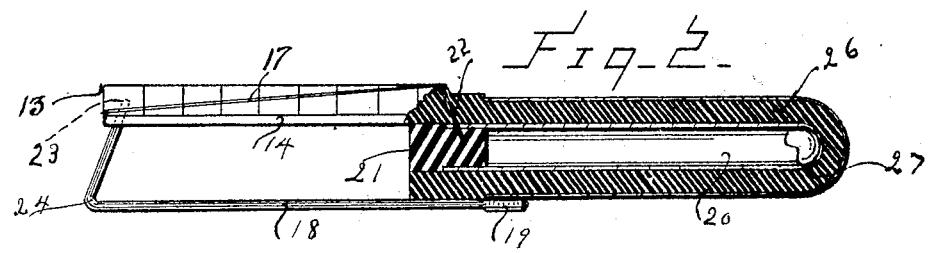
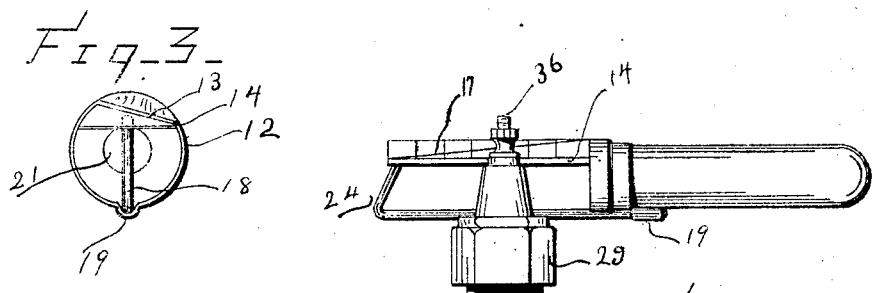
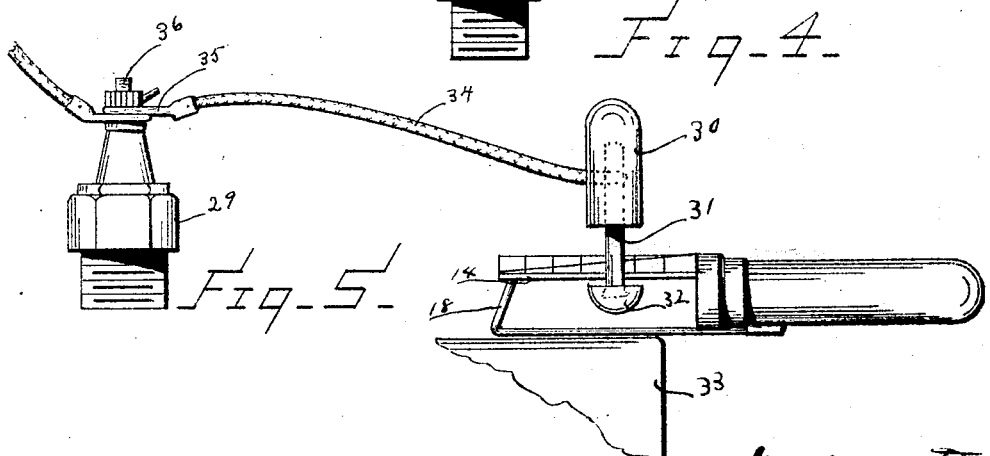
Inventor
WILLIAM S. WITTER
by B. J. Craig
attorney Patented Mar. 31, 1925.

1,531,636

UNITED STATES PATENT OFFICE.

WILLIAM S. WITTER, OF LOS ANGELES, CALIFORNIA.

SPARK-PLUG AND IGNITION TESTER.

Application filed July 13, 1922. Serial No. 574,815.

*To all whom it may concern:*

Be it known that I, WILLIAM S. WITTER, a citizen of the United States, residing at Los Angeles, in the county of Los Angeles and State of California, have invented a certain new and useful Improvement in Spark-Plug and Ignition Testers, of which the following is a full, clear, and exact description, reference being had to the accompanying drawings.

This invention relates to means for testing spark plugs, and particularly to that class of devices whereby the electrical condition of the spark plug may be determined by the character of a spark jumping between electrodes.

The general object of my invention is to provide a simple, convenient and effective tester wherein the principle of the condenser is utilized to draw electrical potential from a high tension ignition conductor across a gap into the tester so that in operation there is no appreciable loss of current from the circuit being tested, while at the same time a strong spark readily observable with the naked eye is provided at the tester gap.

A further object of my invention is to provide a spark plug and ignition tester wherein a single electrode is arranged on a blade of insulating material so that when the edge of this blade is brought in contact with the terminal of an ignition circuit, a spark may be easily observed jumping from the circuit to the electrode.

An additional object of the invention is to provide a tester having an indexed portion thereon with a single electrode arranged on the indexed portion so that when this portion is slid along the terminal of an ignition circuit, the test gap will vary in width whereby the condition of the spark plug, circuit, insulation and the strength of the current may be readily indexed and determined.

Another object of my invention is to provide a tester having a simple and compact grounding means thereon.

A further object is to provide a tester including a flexible conductor having means on one end for quickly and easily attaching it to the terminal to be tested and having on the other end an insulated handle supporting a bare conductor the testing may be made at a point remote from the terminal to be tested.

Further objects of the invention will be apparent from the following specification taken in connection with the accompanying drawings wherein Fig. 1 is a top plan view of a spark plug and ignition tester embodying the features of my invention; Fig. 2 is a longitudinally central sectional view showing the blade in elevation; Fig. 3 is an end elevation of the tester; Fig. 4 is a side elevation of the tester showing it in position on the spark plug and Fig. 6 is a detail in elevation showing the tester in use with an extension.

Referring to the drawing by reference characters 26 indicates the body of the tester. This body is preferably formed of insulating material such as bakelite, vulcanite, fibre, porcelain, or any other suitable material having insulating properties.

The body 26 is provided with an outer covering 10 which may be formed of brass or any material which is a good electrical conductor. Mounted within the body 26 is a member 27 which may be formed of tin foil, aluminum, brass or any other material which is a good conductor of electricity but not necessarily of the same material as the outer shell 10. Elements 10 and 27 should be so mounted within the body 26 as to exclude all air from between them.

The arrangement is such that the body 26 in conjunction with the parts 10 and 27 provide a condenser. The body 26 is preferably provided with ribs 11 and 12 which are preferably integral with the body. The body is shown as provided with a projection or blade 13 which is preferably formed of insulating material and preferably is integral with the body. The edge 14 of the blade is shown as curved to give a greater range of index reading on low tests.

An index is shown on the blade. This may comprise numerals and reference lines 15 and 16. An electrode 17 which is preferably a small sized round wire is shown as embedded into the surface of the blade and arranged at an acute angle to the curved edge 14 of the blade. This electrode 17 is shown at 22 as passing through the insulated body 26 and making contact with the inner element 27 of the condenser.

The element 10 of the condenser is connected to a grounding member 18. This member 18 is secured by means of a small boss 19 which may be soldered onto the element 10 and to which the member 18 may be fastened by threads.

A chamber 20 is preferably formed longitudinally in the body 26 concentric with the outer shell 10, being closed at one end and made air tight by closing at the other end with a plug 21 formed of insulating material. The conductor 18 is shown as embedded at 23 in the under side of the blade 13 in such a manner as to insure insulation between this conductor and the electrode 17. It will be noted that the conductor 18 is bent at 24 and that this conductor is substantially as long as the blade 13.

The grounded portion of a spark plug being tested is indicated at 29. The insulated handle of an extension 34 is shown at 30. The handle 30 is provided with a bare extension which is shown at 31. The end of the bare terminal 31 is preferably provided with insulation at 32 which assists the operator in preventing short circuiting of the current. The conductor 34 should be well insulated, high tension, ignition cable.

The connection 35 should be so constructed as to be conveniently attached to any place where a test is desired; it may be a simple spring clamp with insulated handle, several types of which are now in use. The ground on the engine or frame of the machine to which the plug 29 is also connected is shown at 33 while 36 indicates the insulated electrode of a spark plug being tested.

In the use of this device for testing spark plugs, the ground wire 18 is placed against the metal of the cylinder or spark plug body 29 and the curved edge 14 of the tester blade 13 is placed against the insulated terminal 36 of the spark plug, the contact being made at the end of the blade where the insulated electrode 17 is closest to the edge 14. If the current is of sufficient strength and the plug is not shorted, a spark will be observed to jump from the insulated terminal 36 of the spark plug to the insulated electrode 17 on the tester blade.

The tester is then slid along with the contacts maintained as above stated, and the index read at the point where the spark stops jumping. If there is no current or the plug is shorted, there will be no spark. If the plug is sooted or dirty there will be an intermittent spark which will stop at or before index line 1. If the spark plug gap is too narrow the spark will be constant but will stop at or before index line 3. In normal conditions of the ignition system the spark will continue constant at the test gap to index lines 4, 5, and 6, depending on the system used.

Should the spark continue to the index line 7 and 8 it would indicate that the spark plug gap is too wide. This test and other tests may be made as the user becomes familiar with my tester and in fact, any trouble which will be indicated by the connection of the spark and electrode 17 will be shown by my tester.

It is to be noted that in my testing device, the electrode 17 to which the spark jumps as it enters and leaves the tester, is entirely insulated from the hand of the operator. It will, of course, be understood that this tester usually works with high voltage current which is obtained through an induction coil. I have found by actual practice that when the tester is held as shown in Fig. 4, a spark will readily jump from terminal 36 to electrode 17 when the primary circuit of the induction coil is broken.

Since my device is used on a secondary circuit with a high tension current the current will jump across the gap between the terminal 36 and the electrode 17 and thence into the condenser element 27.

In using the device shown in Fig. 5 the connection 35 is first arranged upon the spark plug 29 as shown in the drawing. This connection 35 is connected to a lead 34 which is in circuit with a conductor 31. This conductor 31 can be handled by means of the insulated handle portion 30 and in order to prevent easy grounding, the lower end or knob 32 of insulated material is provided on the bare conductor 31. The tester is placed on a suitable ground here shown as the engine frame 33 so that the ground wire 18 engages the frame 33. The bare conductor 31 is then moved along the blade 13 and the spark which jumps to the electrode 17 is noted. The lead 34 may be as long as desired so that the actual observation of the spark on the blade 13 can be made at either side of the engine being tested.

I am aware of the fact that spark plug testers have been provided in which one electrode is connected by a conductor to a spark plug and the other electrode connected to a ground, either through a return wire or through the body of the operator, but constructions of this character are open to the objections that inasmuch as a complete circuit is provided, the spark will be short circuited more or less so that the plug will not give a full spark.

Having thus described my invention, I claim:

1. A tester comprising a body having a plurality of condenser elements secured thereto, a ground contact member secured to the body and having connection with one condenser element and a conductor connected to the other condenser element, said ground contact member and said conductor being adjacent to each other and spaced apart.

2. In a tester, a handle member constituting the parts of a condenser, a conductor secured to the handle and electrically connected with one element of the condenser and an electrode secured to and arranged at an angle to the handle and spaced from the conductor, said electrode being connected with the other element of the condenser.

3. A tester comprising a body having a blade thereon, a plurality of condenser elements associated with the body, a ground contact rod arranged adjacent the blade and having one end connected with one condenser element and a conductor connected to the other condenser element and disposed on the surface of the blade.

4. A tester comprising a body having a blade thereon, both constructed of insulating material, a condenser mounted on the body, one element of the condenser being connected with an electrode secured to the blade at an angle to one of its sides and a ground lead connected to the other condenser element and spaced from the electrode.

5. A tester constructed of insulating material and including a body having a projecting portion and provided with a plurality of condenser elements, a grounding rod mounted adjacent said projecting portion and connected with one element of the condenser and an electrode connected with the other element of the condenser and secured to the projecting portion adjacent the edge thereof and spaced from the grounding rod.

6. A tester comprising a tubular body constructed of insulating material and having an attached blade, an electrode arranged on the blade and making an acute angle therewith, a scale on the blade, a condenser on said body, said electrode being attached to a condenser element and a ground attached to the other element of the condenser.

7. A tester of the character described including a body having a blade integral therewith an electrode fixed against relative movement on said blade and at an acute angle to a side of the blade, a ground wire for maintaining a continuous ground contact while the tester is being used and additional means whereby the current will jump from a terminal to the electrode.

8. A tester comprising an insulating body having a projecting blade thereon, a condenser disposed on said body, one element of the condenser being provided with a conductor extending from said body and engaging said blade, an electrode connected with the other element of the condenser and disposed on the blade and extending at an acute angle to the edge thereof, said electrode being insulated from said conductor.

9. A tester of the character described comprising an insulating tubular body having an extending blade and having a condenser on the body thereof, a conductor connected to one condenser element, said conductor being arranged substantially parallel to and spaced from said blade, one edge of said blade being curved and an electrode arranged at an acute angle to the curved edge of the blade and in circuit with the other element of the condenser.

10. A tester comprising a body constructed of insulating material, a blade secured thereto, two metallic members mounted one within and the other without said body and insulated from each other to provide condenser elements, a conductor connected with one of the members to form a contact with a ground and an electrode connected to the other member and disposed adjacent the edge of the blade.

11. A tester comprising an insulating tubular body with an eccentrically arranged blade thereon, a scale described on the blade longitudinally thereof, condenser elements insulated from one another and mounted on said body, a lead extending from one condenser element and arranged at an angle to the edge of the blade and a conductor spaced from said lead and connected with the other element of the condenser.

12. A tester of the character described including a body having a blade integral therewith condenser elements on said body, an electrode mounted on said blade and connected to one element of the condenser, a ground wire for maintaining a continuous ground contact with the other element of the condenser while the tester is being used, said means being arranged to provide an ever increasing gap for the current to jump to the electrode.

13. In a tester, the combination of an insulated tubular body having a blade thereon, a condenser carried by said body, a ground contact for one condenser element, an electrode connected with the other condenser element and disposed diagonally on the blade adjacent one edge thereof, whereby the distance between the electrode and a terminal being tested may be varied, and an extension, said extension comprising a conductor for connecting to said terminal to be tested and having an insulated handle and an exposed surface adapted to be engaged by the blade.

14. A tester comprising a body of insulating material, a blade of insulating material attached thereto, two metallic members disposed one within and one without the body in such a manner as to be substantially insulated one from the other whereby they function as a condenser, an electrode connected to one element of the condenser and arranged on the blade at an acute angle to one edge thereof, a grounding conductor attached to the other element of the condenser and supported adjacent the blade, said conductor being insulated from the electrode mounted on the blade.

15. A tester comprising an insulated hollow tubular body provided with a plurality of condenser elements, a grounding rod secured to said body and connected with one element of the condenser, an electrode secured to said body and spaced from the grounding rod, said electrode being connected to the other condenser element and means on said body for hermetically sealing the same air tight.

In testimony whereof, I hereunto affix my signature in the presence of two witnesses.

WILLIAM S. WITTER.

Witnesses:
A. B. GARDNER,
H. E. TOWNSEND.